United States Patent [19]

Shu

[11] Patent Number: 6,016,470
[45] Date of Patent: Jan. 18, 2000

[54] REJECTION GRAMMAR USING SELECTED PHONEMES FOR SPEECH RECOGNITION SYSTEM

[75] Inventor: Chang-Qing Shu, Billerica, Mass.

[73] Assignee: Gte Internetworking Incorporated, Cambridge, Mass.

[21] Appl. No.: 08/969,031

[22] Filed: Nov. 12, 1997

[51] Int. Cl.$^7$ ........................................... G10L 5/06
[52] U.S. Cl. ..................... 704/244; 704/240; 704/254
[58] Field of Search ................................. 704/240, 243, 704/244, 254

[56] References Cited

U.S. PATENT DOCUMENTS

| | | | |
|---|---|---|---|
| 5,390,278 | 2/1995 | Gupta et al. | 704/243 |
| 5,675,706 | 10/1997 | Lee et al. | 704/256 |

OTHER PUBLICATIONS

Richard C. Rose and Douglas B. Paul, "A Hidden Markov Model Based Keyword Recognition System," Proc. IEEE iCASSP 90, vol. 1, pp. 129–132, Apr. 1990.

Satoru Hayamizu, Katunobu Itou, and Kazuyo Tanaka, "Detection of Unknown Words in Large Vocabulary Speech Recognition," Proc. Eurospeech '93, vol. 3, pp. 2113–2116, Sep. 1993.

John Makhoul and Richard Schwartz, State of The Art In Continuous Speech Recognition, Proc. Natl. Acad. Sci. USA, vol. 92, pp. 9956–9963, Oct. 1995, Colloquium Paper.

Renato De Mori, Charles Snow, and Michael Galler On The Use Of Stochastic Inference Networks For Representing Multiple Word Pronunciations 0–7803–2431, pp. 568–571, May 5, 1995 IEEE.

Pedro J. Moreno, David B. Roe, and Padma Ramesh Rejection Techniques In Continuous Speech Recognition Using Hidden Markov Models Behavior Science Publishers B.V., pp. 1383–1386, 1990.

David Goddeau, and Victor Zue Integrating Probabilistic LR Parsing Into Speech Understanding Systems 0–7803–0532–9/92 pp. I–181–I–184, 1992 IEEE.

*Primary Examiner*—David R. Hudspeth
*Assistant Examiner*—Tālivaldis Ivars Šmits
*Attorney, Agent, or Firm*—Leonard Charles Suchyta

[57] ABSTRACT

A method for processing speech recognition including a system for generating a first probability of the word or sequence that words in a speech utterance is rejectable and a second probability that the word or sequence of words in the utterance is acceptable. A new Selected Phoneme Rejection Grammar is constructed of phonemes and/or merged phonemes. The highest first probability is calculated by comparing the utterance to sequence of the Rejection Grammar phonemes and/or merged phonemes. A Main Grammar is implemented in which the highest second probability is calculated that the utterance is composed of words in the Main Grammar. The two highest probabilities are compared and the utterance is accepted or rejected depending on the higher of the two highest probabilities. If accepted a sensible response may be made as determined by the specific application. If it is more probable that the sequence is in the rejection grammar, the utterance is rejected and as appropriate response as determined by the specific application is returned. The Rejection Grammar constructed by the new method is of small size, comprising often thirty or fewer selected phonemes. However, even with the small sized Rejection Grammar it is practical for use with small and large Main Grammars.

23 Claims, 5 Drawing Sheets

REJECTION GRAMMAR USING SELECTED PHONEMES FOR SPEECH RECOGNITION SYSTEM

FIELD OF THE INVENTION

The present invention relates generally to speech recognition, and more particularly to systems having a Main Grammar that determine a probability that an utterance is composed of words in a Main Grammar vocabulary.

BACKGROUND OF THE INVENTION

Systems for speech recognition have been developed to recognize and understand an utterance of a word or words in a sequence. The recognition of an utterance comprises analyzing the sequential phonetic parts of the utterance and generating probabilities that spoken words are found in a sequence of words. Other systems have developed a Rejection Grammar with a vocabulary of words. The highest probabilities are developed for the utterances being in the Main and in the Rejection Grammars, the highest probability determines if the speech recognizer accepts or rejects the utterance.

Figure 1:
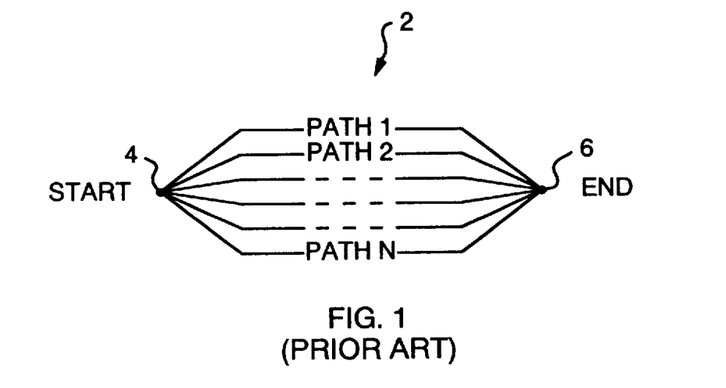
FIG. 1 is a block flow diagram of a prior art speech recognition system.

FIG. 1 is a block diagram/flow chart for a Main Grammar system. Each path 2 starts from a first node 4 and ends at a second stop node 6. Each path consists of a word or a sequence of words. For a given utterance, the speech recognition system (SR) will map every path in the Main Grammar for the utterance, and the system will compute probability scores for every path. The word sequence in the Main Grammar that has the highest score is accepted by the system as the "correct" one by the SR, and the appropriate/sensible response is output as determined by the system design.

However, a limitation of system using only a Main Grammar as in FIG. 1 is illustrated by the following example. A question is posed, "Are you past your twentieth birthday?" The only utterances that are an acceptable answer are "yes" or "no". which are the only two word paths of the Main Grammar. If a "yes" or a "no" is returned the system will compute the score for each response, which will be high. The system will determine that response was in the Main Grammar, and, thus, "understood" by the system. The system can make a sensible response depending on the specific application. For example a line on a form can be completed by the system. However, if some other utterance is received, e.g. "good-bye," the system will compute the probability score that the "good-bye" response was a "yes" or a "no." The system will accept the higher of the scores and an error will occur.

MAIN GRAMMARS:

Recognition of words in the Main Grammar using triphoneme probabilistic models have been developed as described in the references below. The present invention relates only to Rejection Grammars and will operate with substantially any Main Grammar. One prior art speech recognition approach (Main Grammar) is described in a paper, *State of the Art in Continuous Speech Recognition*, by John Makhoul and Richard Schwartz, published in the Proceedings of the National Academy of Sciences on Feb. 8–9, 1993. This paper is incorporated herein by references as if set out in full. The words are recognized by use of the triphoneme model using Hidden Models and algorithms such as the Viterbi. Grammars used to determine the speech can be complex as the size of the vocabulary 30 and the length of the utterance being analyzed increase.

WORD REJECTION GRAMMARS

Figure 2:
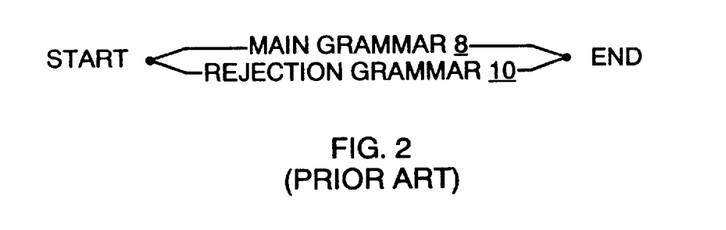
FIG. 2 is a block diagram of another prior art speech recognition system including a second parallel path incorporating a Rejection Grammar.

In order to handle out-of-grammar response researchers have developed a "Rejection Grammar" theory with the Rejection Grammar formed in parallel to the Main Grammar as shown in FIG. 2. The Main Grammar 8 remains as in FIG. 1. The system, when an utterance is received, will compute the highest probability scoring of all the paths in the Main Grammar as well as the highest scoring path of all the paths in the rejection Grammar. If the highest score was found for a path in the Rejection Grammar (higher than any score found for the Main Grammar) the utterance is rejected as "out of grammar." If the highest score was found for a path in the Main Grammar, the utterances is accepted as in the grammar and the SR system so reports. The system will perform, as designed, to that "understood" utterance.

Figure 3:
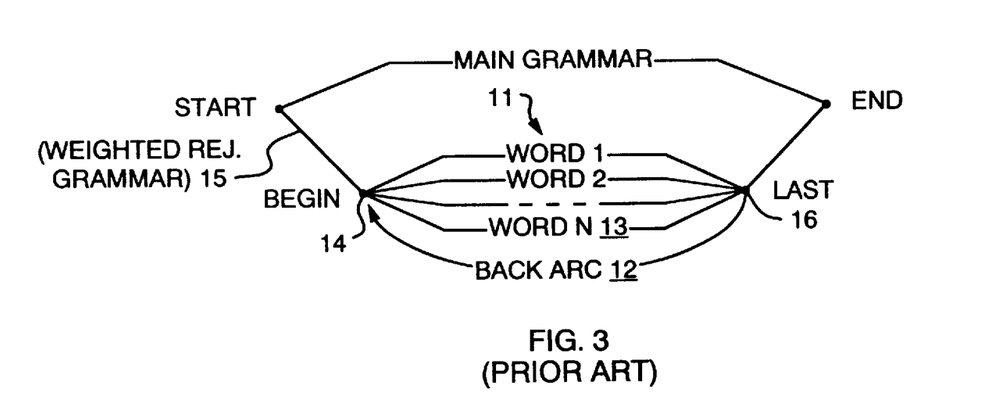
FIG. 3 is yet a third block diagram of a prior art system where incorporating a word loop back and weighting function.

A practical implementation of a Rejection Grammar is shown in FIG. 3, which is a Select Word Rejection Grammar. In this system, there is a vocabulary of words in a Main Grammar, and a vocabulary used in the Select Word Rejection Grammar comprised of all the words in the Main Grammar vocabulary plus some number (maybe large) of additional words. As shown in FIG. 3A, the Select Word Rejection Grammar provides a back arc 12, and a weighting factor 15 path to a Begin node 14, that are improvements over the system of FIG. 2. The loop back 12 acts to process the sequence of words in the utterance and calculate probabilities over multiple parallel word path representing all the possible word combinations in the Rejection Grammar.

For example, with respect to FIG. 3, WORD 1, WORD 2 . . . WORD N are word paths which run from the BEGIN node 14 to the LAST node 16. These are the first group of word paths used. However, because there is a BACK ARC 12 from the LAST node 16 back to the BEGIN node 14, the same word paths, WORD 1, WORD 2 . . . WORD N, are used again, and again. The actual operation of the Rejection Grammar with the BACK ARC supports all combinations of the possible word paths as follows, first showing the single word path and then for combinations of using the BACK ARC once and the word paths twice:

(WORD 1)
(WORD 2)
........
(WORD N)
(WORD 1)(WORD 1)
(WORD 1)(WORD 2)
................
(WORD N)(WORD 1)
(WORD N)(WORD 2)
................
(WORD N)(WORD N).

Continuing use operation with the BACK ARC 12 produces:

(WORD 1)(WORD 1)(WORD 1)
(WORD 1)(WORD 1)(WORD 2)
........................
(WORD N) ............WORD N)

The operation of the BACK ARC 12 word loop yields all the combinations of all the words in the Rejection Grammar vocabulary as possible word sequence paths.

The Select Word Rejection Grammar is built using all the words from the Main Grammar plus some number of added "words" (which may be real words or simply non-real word sounds). Of course, the words and the sounds are digitized representations suitable for processing via computer systems. All the words in the language should be included in the Rejection Grammar so that spoken words outside the Main Grammar, when analyzed in the Rejection Grammar will have a high probability of being rejected. However, if the same recognition techniques are used in the Main and Rejection Grammars, an actual utterance analyzed in the parallel paths of the Main and the Rejection Grammars, may produce the same probability score in both Grammars. To avoid this occurrence the weighting factor 15 is set to less than one.

In order to make the speech recognition more accurate by reducing the false rejection rate, the additional "words" in Rejection Grammar word set (those words over and above the words in the vocabulary of the Main Grammar) are constructed as follows:

1) include a specific word set; and
2) remove any word from the specific word set that has a similar sound to any word in the Main Grammar.

Still referring to FIG. 3, a weighting factor 15 of less than one reduces the calculated probabilities for the Rejection Grammar. This factor is known in the art as "Rejection Sensitivity." Rejection Sensitivity is a tradeoff between two main types of recognition errors: false acceptance (false positives)—where an illegal utterance is accepted as a legal utterance; and false rejection (false negative) where a legal utterance is rejected as an illegal utterance. If the Rejections Sensitivity is lowered there will be fewer false negatives but more false positives. The relative number of false positives to false negatives can be skewed towards one or the other with the "Rejection Sensitivity" in specific applications by the designer. A discussion of the tradeoff and the implementation is found in Addendum 1, to this application, *HARK Recognizer Reference Manual*, Chapter 4: Rejection, release 2.0, BBN Corp. It should be noted that there is a basic aim of all SR systems to reduce both false accept and false reject recognition errors, to maximize accuracy.

The above prior art systems, utilizing a Select Word Rejection Grammar, are limited by the need for large memories when large vocabularies are used. The total size of a grammar including a Main and a Rejection Grammar will be at least two times the size of a Grammar using only a Main Grammar. This large size is a limitation of the use of prior art word Rejections Grammars. This large size also can increase the cost and decrease the speed of the SR systems. Moreover, as described and recognized in prior art, Select Word Rejection Grammars have been found to be not suited for applications with large vocabularies of nearly all the words in any given language.

It is an object of the present invention to provide a practical speech recognition system with rejection functionality applicable for any size vocabularies.

It is an object of the present invention to provide a speech recognition system based on a Main Grammar and a Rejection Grammar wherein the Rejection Grammar Vocabulary remains substantially the same size regardless of the size of the Main Grammar vocabulary.

Another object of the present invention is to improve the accuracy, speed, cost, and size of vocabularies of speech recognition systems with rejection functionality.

It is another object of the present invention to provide a speech recognition system with rejection functionality for use with nearly all the words in a language.

SUMMARY OF THE INVENTION

The foregoing objects are met in apparatuses and methods for a speech recognition system having parallel grammar structures comprising a Main Grammar and a Rejection Grammar. In the Main Grammar, the highest probability is calculated that an utterance is formed from a vocabulary of words found in a language. In the Select Phoneme Rejection Grammar, the highest probability is calculated that the utterance is formed from a selected group or list of phonemes or merged phonemes found in the language. Phoneme used herein is defined to include all phonetic or acoustic parts or breakdowns of spoken utterances. If the main Grammar highest probability is higher than the Rejection Grammar highest probability for a given utterance, the utterance is accepted whereupon the system may perform some desired function or task. If the Rejection Grammar highest probability is higher than the Main Grammar highest probability, then the utterance is rejected. In a preferred embodiment, there may be different weights given to the Main Grammar probability calculation and the Rejection Grammar probability calculation.

Another aspect of the present invention is that it provides an improved speech recognition system that makes use of but does not change Main Grammars. It has been found that accurate results can be found by constructing Rejection Grammars by compiling lists of models of phonemes, calculating probabilities that the digitized utterance "fits" the phoneme paths comprised of the combinations of phonemes in the Rejection Grammar.

In yet another aspect of the present invention, the set of phonemes in Rejection Grammar is selected by training the system with a set of utterances where the false rejection error rate is reduced, and the total error rate of false rejections and false acceptances are minimized. The phonemes are selected by re-running the speech recognition method and apparatus and accumulating the false rejections. The number of occurrences of the phonemes associated with these rejections is tabulated. One or more phonemes with the higher totals are deleted from the list of phonemes used in the Rejection Grammar and the speech recognition system is re-run. This process is repeated until there is a acceptable accuracy from the speech recognizer.

The computer system used with the Select Phoneme Rejection Grammar may contain a software or hardware product that performs the speech recognition having a database of a selected group or list of phonemes or merged phonemes. A calculation of the probability that any utterance is composed of a phoneme or sequence of phonemes is carried out in such a system.

The number of phonemes deleted is determined experimentally. The test for completion is when the total error rate of the false rejections and false acceptances does not lower after a phoneme or group of phonemes is deleted.

In another preferred embodiment, merged phonemes, as described below, are used in place of and with single phonemes.

An advantage of the present invention is illustrated by a Select Phoneme Rejection Grammar in the following example. Consider that a 300 word Main Grammar vocabulary is used. The average word has four phonemes which results in a 300 times 4 or 1200 phonemes. An aspect of the present invention is that the Rejection Grammar contains only thirty phonemes in one preferred embodiment. A greater or fewer number of phonemes is used in other preferred embodiments. This use of phoneme sequences to establish a probability of the utterance being out-of-grammar represents a 40/1 reduction compared, at least, to the prior art use of a select Word Rejection Grammar. Remember that the minimum size of the Select Word Rejection Grammar is the size of the Main Grammar.

Another advantage of the present invention is that main Grammars with large vocabularies can be accommodated with Rejection Grammar vocabularies of about thirty phonemes. An associated advantage is that smaller, and therefore less costly, memories can be used.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 4:
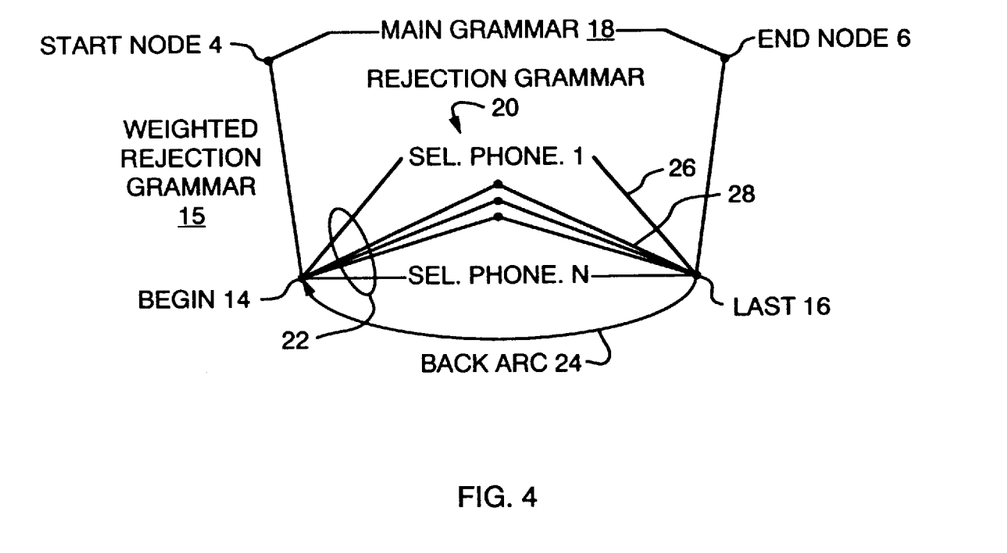
FIG. 4 is a block diagram of the inventive system.

FIG. 4 is a block diagram of the invention that is similar to FIG. 3, including a Main Grammar, a Start node 4, and an End node 6, a Begin node 14, and a Last node 16. However, the Rejection Grammar 20 is formed of the multiple parallel paths 22 from the Begin Node to the Last node where the probability of sequences of phonemes only, not words, is calculated. In this embodiment consider that there are thirty Select Phoneme paths 22 from Begin 14 to Last 16. In other preferred embodiments there could be a greater or fewer number of select phoneme paths. That is PHONEME 1, PHONEME 2 . . . PHONEME N are the phoneme paths which run from the BEGIN node to the LAST node. These are the first group of phonemes paths used. However, because there is a BACK ARC from the LAST node back to the BEGIN node, the same phoneme paths, PHONEME 1, PHONEME 2 . . . PHONEME N, are used again and again. The actual operation of the Rejection Grammar with the back arc supports all combinations of phonemes as the possible phoneme paths as follows:

---
(phoneme 1)
(phoneme 2)
........
(phoneme N)

(phoneme 1) (phoneme 1)
(phoneme 1) (phoneme 2)
........
(phoneme N) (phoneme N)
........
(phoneme N) ....(phoneme N)
---

The path with the highest probability is determined, and, if it is in the Rejection Grammar, then the utterance is rejected as out-of-grammar. The effect of the weight 15 given to the Rejection Grammar is as described previously.

The selection of the word paths in the Main Grammar is determined by the specific application.

Figure 5:
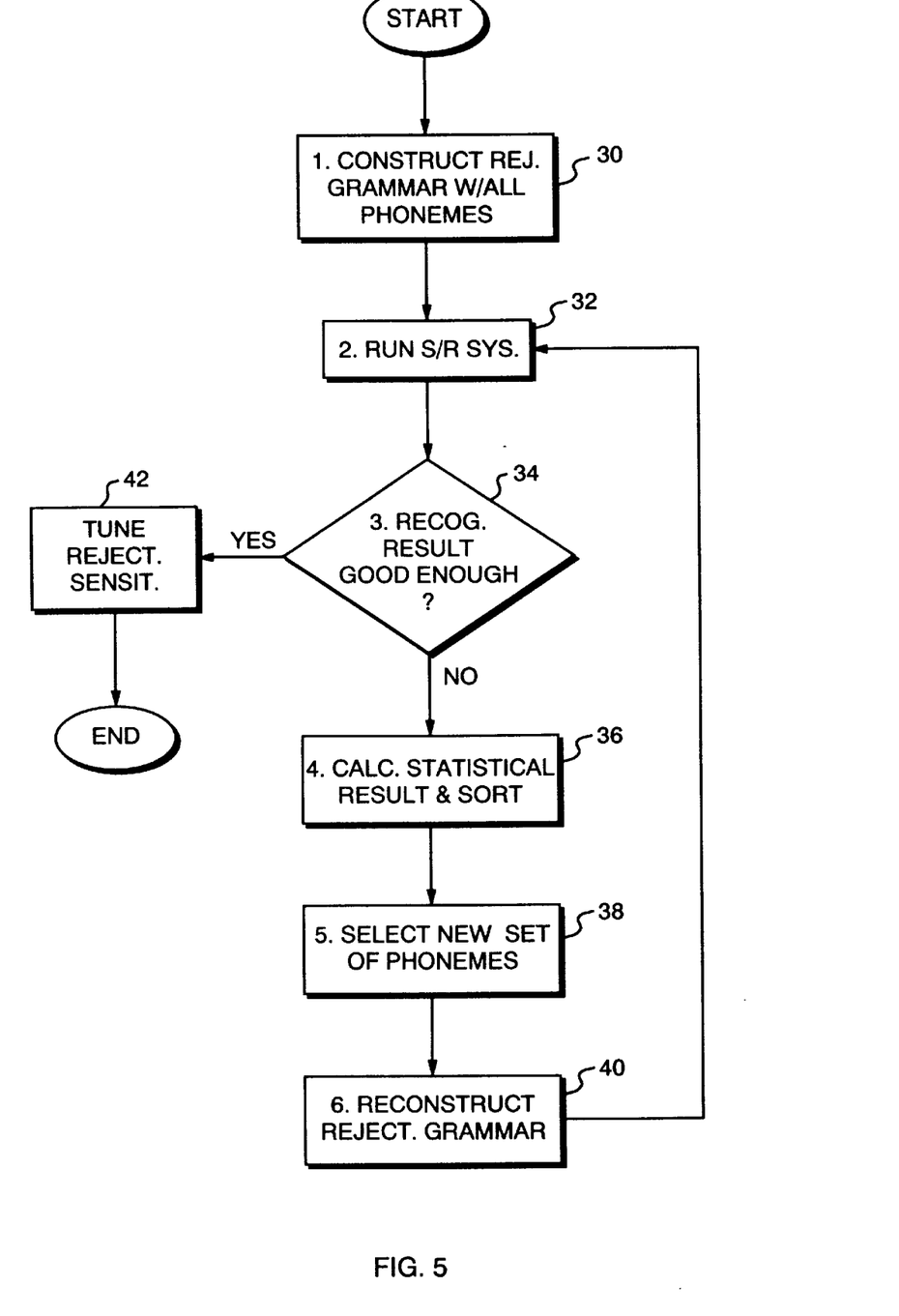
FIG. 5 is a block diagram flow chart of the method of selecting the phonemes.

The phonemes selected for use in the Select Phoneme Rejection Grammar is generated as shown in FIG. 5. The process in FIG. 5 will yield a selected subset of phonemes from the language of the utterance that are suitable for the inventive Rejection Grammar. The subset is selected experimentally to optimize the accuracy of the SR system. The first step is to generate and store the list of all the phonemes found in the language 30. The next step is to set the weighting function 15 of FIG. 4 to one so that the Main and the Rejection Grammars have the same weight during the selection of the subset of phonemes. Next, accumulate and store a test set of both in-grammar and out-of-grammar utterances, in a preferred embodiment, as audio waveform files. In Table 1, a small test set of audio files are listed as wav-1, wav-2, wav-3, and wav-4, recorded on tape, or in a memory, or in an equivalent storage medium. This test set of utterances is run through the SR system of FIG. 4 and the results 34 recorded, as shown in FIG. 5. Table 1 contains possible results for the small test set. In this example, a question is asked in which the only acceptable responses are "yes" and "no", which compose the Main Grammar vocabulary. However, other words such as "good" or phrases such as "I don't know," or any other possible set of words or sounds in the language may constitute the response in addition to "yes" and "no."

TABLE 1

| AUDIO FILE | ACTUAL WORD SPOKEN | IN/OUT OF GRAMMAR | SR RESULT | EX- PECTED RESULT | CLASSI- FICATION |
|---|---|---|---|---|---|
| wav-1 | "yes" | in | yes | accept | true accept |
| wav-2 | "no" | in | reject | accept | false reject |
| wav-3 | "I don't know" | out | reject | reject | true reject |
| wav-4 | "good" | out | yes | reject | false accept |

The results are that wav-1 and wav-3 were handled properly by the SR, but wav-2 and wav-4 were mis-handled. The wav-2 "no" was in the vocabulary and should have been accepted, but the SR rejected it (false reject); and the wav-4 "good" was not in the word path in the Main Grammar and should have been rejected, but the SR accepted it (false accept).

For a discussion of phonemes used in the examples herein, the English language please see, THE JOURNAL OF THE ACOUSTICAL SOCIETY OF AMERICA, Volume 27, #2, Page 310, 1955. The designation below of the various phonemes uses the notation found in this reference. However, the present invention is not dependent upon any particular set of phonemes and their designations. The following is illustrative and instructive and those skilled in the art will understand the techniques described and be able to apply the techniques to other languages and sets of phonemes.

In another example, illustrated in Table 2, consider that the falsely rejected words were "yes" in the first five entries in TABLE 2, and "no" in the next five entries in TABLE 2. The phonemes listed are representative of the actions of the SR to break down the utterance into the phonemes in the Select Phoneme Rejection Grammar. Only the falsely rejected utterances are tabulated here.

TABLE 2

| ACTUAL WORD IN AUDIO FILE | PHONEME FROM SR |
|---|---|
| yes | Y-AE-V-S |
| yes | Y-AU-Z |
| yes | Y-AU -P-IX |
| yes | Y-EH-V-F |
| yes | DH-AU-L |
| no | DH-DH-OW |
| no | F-DH-EH-OW-V |
| no | M-EH-W |
| no | M-DH-AU-IX |
| no | DH-R-OW |

Still referring to FIG. 5 with utterances and the phonemes found for the falsely rejected utterances, the results are reviewed 34 for accuracy. If the result are not good enough, a list of all the phonemes found by the SR in the false rejections is tabulated with the result presented in descending order by quantity.

An example of false rejects for a larger test set of utterances is illustrated in TABLE 3 . TABLE 3 shows the number of times each of the listed phonemes was found by the SR in cases where false rejections occurred. If the entrance to step 36 was the first such entrance than all the phonemes in the language would be listed. The set of phonemes listed in TABLE 3 is again illustrative.

TABLE 3

| Phoneme | Number of Occurrences |
|---|---|
| DH | 132 |
| Y | 67 |
| AU | 57 |
| AE | 56 |
| M | 29 |
| OW | 23 |
| V | 18 |
| EH | 17 |
| AX | 17 |
| AH | 16 |
| EI | 11 |
| N | 11 |
| S | 10 |
| HH | 9 |
| IH | 9 |
| W | 8 |
| UW | 7 |
| B | 7 |
| D | 6 |
| JH | 6 |
| OH | 5 |
| Z | 5 |
| ER | 5 |
| UH | 5 |
| L | 4 |
| F | 3 |
| NX | 3 |
| AA | 3 |

When step 34 of FIG. 5 is performed the first time, the top 8 to 12 phonemes, for example, are deleted them from the list of phonemes. The amount may vary as determined below by iteratively running the SR with a changing set of phonemes focused on reducing the error rate. TABLE 3 is an illustrative list of phonemes associated with SR false rejection errors. Remove a number of phonemes starting with the phoneme appearing most often, DH in this case. This is shown in FIG. 5, step 38. The phonemes are deleted because these were the most prevalent phonemes involved with the SR false rejection errors. The process of FIG. 5 is run again with the new subset of phonemes. For example, TABLE 3 phonemes DH through AX may be deleted from the original list of phonemes leaving the remainder for constructing a new Rejection Grammar 40. Step 32 is run again with the new Rejection Grammar and the results are tabulated and the error rate compared to the initial error rate. This loop process of deleting the most prevalent phonemes found in the false rejects continues with the new phoneme subset until the accuracy of the SR is acceptable.

In the above reference that describes phonemes for the English language, there are subgroups of phonemes described. These subgroups are groups of phonemes with similar acoustics. For example, using the same notation as above, in the English language, such subgroups include: (B, P), (D, T), (G, K), (S, Z), (V, F), (M, N), (IY, IH, EH, AE), (AA, ER, AH, AX, AO), (UW, UH, OW), and (AY, OY, AU, EY). When phonemes are deleted, as described above in FIG. 5, care must be taken to ensure that each subgroup is not empty. If both B and P (from the first group) were deleted from the rejection grammar phoneme list, fewer of the test utterances would be found to have high probabilities of being in the rejection grammar, thereby higher false positives would occur. It is important for the Rejection Grammar to have representatives in all the phoneme subgroups since the out-of-vocabulary utterances may use these groups and the Rejection Grammar should have the ability to recognize these groups for a fair determination of the out-of-grammar utterances. For example, if there is no B P phoneme subgroup in the Select Phoneme Rejection Grammar, B or P phonemes will not be recognized by the Rejection Grammar. The probability score will be very low in the Select Phoneme Rejection Grammar, and, therefore, not rejected. This will increase the chance that the utterance will have a higher score and be accepted as in the Main Grammar (even if in error). If the B or P group was represented the score for the Rejection Grammar would be raised increasing the chance that the utterance would be rejected.

Figure 6:
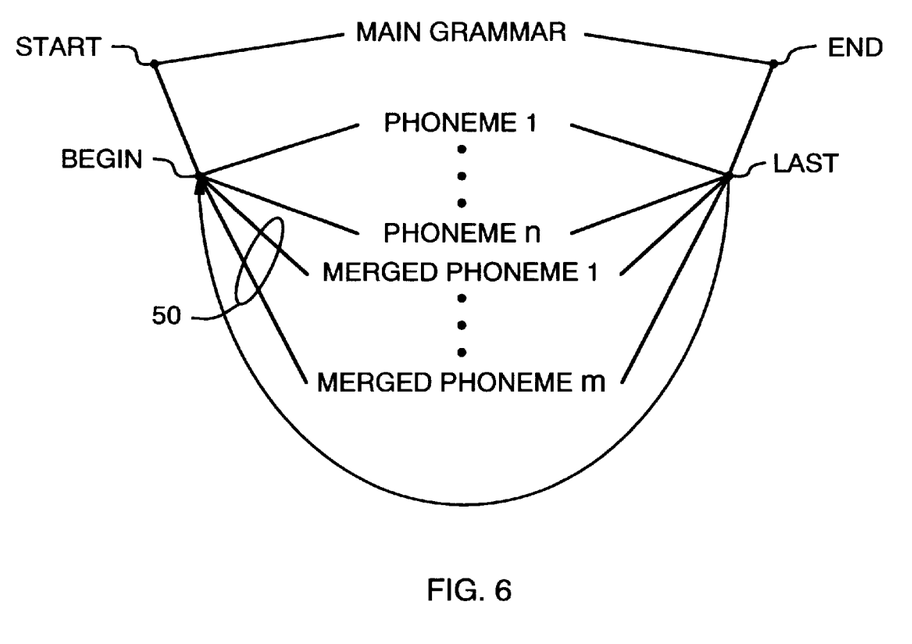
FIG. 6 is another block diagram flow chart including merging phoneme groups.

Therefore, care must be taken so that the subsets of phonemes required by the language are not emptied as phonemes are deleted while optimizing the Rejection Grammar. One approach is to form merged phoneme groups. Consider the subgroup (IY, IH, EH, and AE), if the phoneme IY were eliminated during the application of the process of FIG. 5, a modified subgroup of (IH, EH, and AE) is formed. If the IY phoneme is encountered by the Rejection Grammar the modified subgroup is used to represent the IY phoneme. However, there will be a limitation if the actual acoustic sound cannot be associated with the subgroup because of the acoustic difference. This would result in a higher false acceptance rate for the SR. This limitation is handled by forming merged phonemes as in FIG. 6. This diagram is similar to FIG. 4, with the addition of the Merged Phoneme arcs 50. Each of the Merged Phonemes are grouping of two or more of the original phoneme set that is used in the language itself. The selection of the combination of the phonemes and the Merged Phonemes is similar to the process as shown in FIG. 5. The process of FIG. 5 is modified as follows: rather than delete phonemes, each phoneme deleted is replaced by a merged phoneme subgroup and the process is continued. For example, if the phoneme IY (from the grouping shown above) is to be deleted in accordance with the process of FIG. 5, it is replaced by the merged phoneme MIY, and the process of FIG. 5 continues. The merged IY phoneme, referred to as MIY ,is formed as follows: since the IY is part of the subgroup that includes IH, EH, and AE, the MIY includes a combination of all four phonemes in that group. The SR system, as described in the above referenced, Makhoul et al. paper, uses the probabilities of the phonemes for recognition. The probability distribution (pdf) for the MIY is:

$$pdf(MIY)=W(IY)pdf(IY)+W(IH)pdf(IH)+W(EH)pdf(EH)+W(AE)pdf(AE),$$

where W is the weight given to the Rejection Grammar. Whenever the phoneme IY is deleted the MIY is included.

Still referring to FIG. 5 when an optimum number of phonemes and/or merged phonemes has been found to give an acceptable accuracy result to the test set of utterances, the exit from step 34 is YES. The Rejection Sensitivity 42 can be tuned as desired by the SR designer. With regard to FIG. 4, the Weighted Rejection Grammar 15 is tuned in FIG. 5, 42 to further minimize the error rate in the recognition results. This is accomplished using algorithms well known in the computer science art. The weighting determines the ratio of false acceptances to false rejections. The higher the weighting more utterances will be rejected (both truly and falsely) and the lower the weighting more utterances will be accepted (both truly and falsely). Briefly, the ratio of false acceptances to false rejections depends on the application and the penalties associated with each type of error. For example, it is more prudent to raise the weighting where accepting an illegal command could result in injury or other such substantial loss. However, where accepting illegal utterances has little detrimental effect the weighting may be set lower. A more fully developed discussion of such a search algorithm as applied to FIG. 5 is found in the above referenced Addendum 1.

Figure 7:
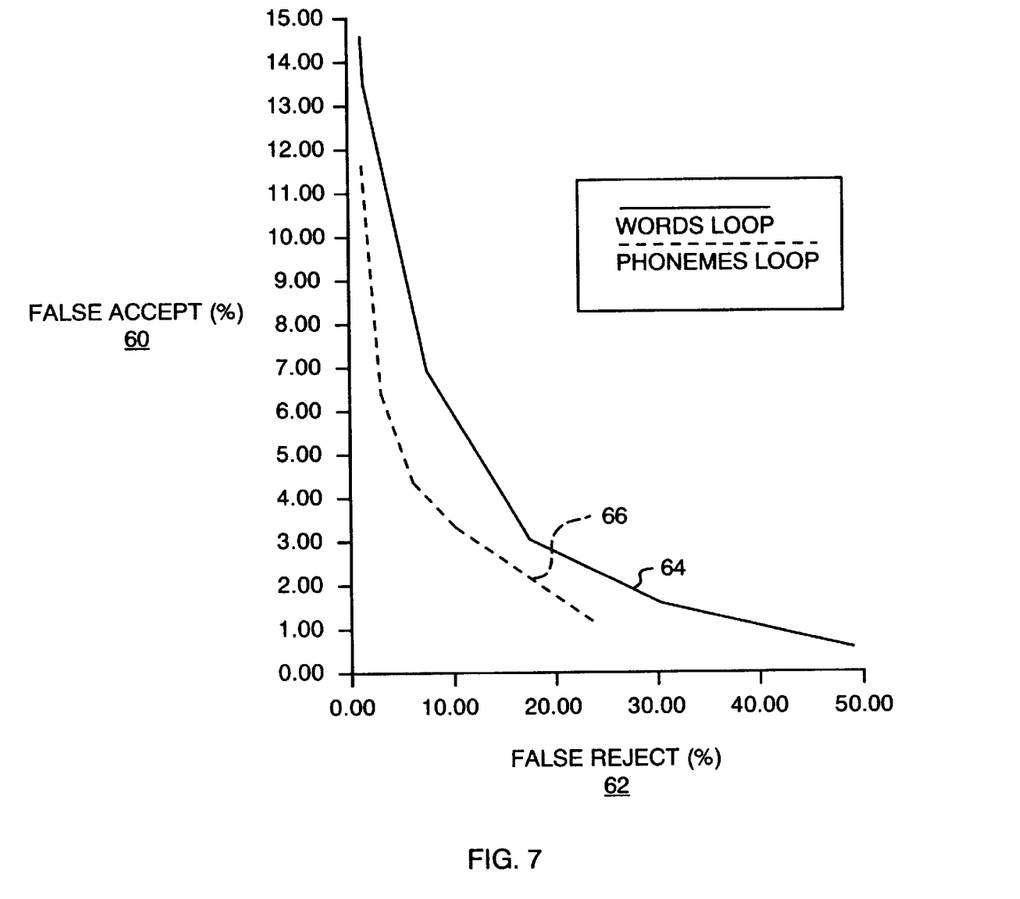
FIG. 7 is a graph showing comparative error rates of the present invention and the prior art systems using a random test sample.

The inventive process, Select phoneme Rejection Grammar, was experimentally run compared to a SR using the Select Word loop Rejection Grammar. The results are shown in the graph of FIG. 7. The ordinate 60 is the percentage of false acceptances and the abscissa 62 is the percent of false rejections. The solid line is the results using the Select Word Loop, and the dotted line is the results using the Select phoneme Loop. Over the entire range of the graph of FIG. 7, the false rejection percentage and the false acceptance for the Select Phoneme Loop is about half that for the Select Word Loop.

Table 4 shows a broad experimental results again comparing a Select Phoneme Loop (A) and a Select Word Loop (B) Rejection Grammar.

TABLE 4

|  | A | B |
| --- | --- | --- |
| Number of sentences | 11,800 | 11,800 |
| Sentences out of Vocabulary | 10.34% | 10.34% |
| False Rejects | 3.72% | 6.81% |
| In-vocabulary correct tag w/o rejection | 94.33% | 94.60% |
| Cost (FA+TagErr+FR) | 1638 | 1809 |
| Error Cost Rate | 13.8% | 15.3% |

Where FA is False Accept; FR is False Reject: TagErr is the number of time the SR system fails to recognize sentences with equivalent words. Tag represents, as described in Addendum 1, equivalent words. For example, the system may have given identical tags to the words "zero" and "oh", determining erroneously that these two words are equivalent.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A rejection grammar process for use in speech recognition of an utterance comprising the steps of:

selecting a digitized sub-list of phoneme models from a digitized list of phoneme models in a language, presenting a digitized sequential representation of the utterance to the rejection grammar process, and calculating a first set of probabilities indicating how well the digitized sequential representation of the utterance matches sequential combinations, or paths, of the digitized sub-list of phoneme models.

2. The method of claim 1 wherein calculating the first set of probabilities comprises the steps of:

comparing the digitized sequential representation of the utterance to all possible sequences of phoneme models from said digitized sub-list of phoneme models, and calculating the probabilities from said comparing step.

3. A speech recognition process comprising the rejection grammar process as set forth in claim 1 and further comprising the steps of:

generating a digitized list of words, comparing the digitized sequential representation of the utterance to sequences of said digitized list of words using an accepted main grammar process, calculating a second set of probabilities from said comparing step, determining the highest probabilities from each of the first and the second sets of probabilities, comparing the highest probabilities from each of the first and second sets of probabilities, if the highest probability is found in the first set of probabilities, rejecting the utterance, and if the highest probability is found in the second set of probabilities, accepting the utterance.

4. The method of claim 3 further comprising the step of:

weighting said first set of probabilities and said second set of probabilities unequally.

5. The rejection grammar process of claim 1, wherein generating the selected digitized list of phoneme models comprises the steps of:

(a) compiling a complete list of all phoneme models in a language, (b) forming a test set of digitized sequential representations of utterances, with known acceptable and rejectable parts thereof, (c) running said rejection grammar process, analyzing the results found for the test set, and accumulating a false rejections list and a false acceptance list and statistics of false rejections and of false acceptances, and (d) determining if the statistics of the process is acceptable, if acceptable, using the list of phoneme models, and if not acceptable:

1. determining and counting the phoneme models found in the accumulated false rejection list, 2. forming an ordered list, starting with the highest quantity, of said phoneme models found in part (1), 3. deleting a selected number of phoneme models from the beginning of the ordered list leaving another, smaller, selected digitized list of phoneme models, and 4. repeating step (c) until the statistics of the method are acceptable.

6. The rejection grammar process of claim 1, wherein generating the selected digitized list of phoneme models comprises the steps of:
   (a) compiling a list of all phoneme models in the language;
   (b) creating a test set test digitized sequential representations of utterances, with known acceptable and rejectable parts thereof;
   (c) determining and counting the phoneme models found in the accumulated false rejections list;
   (d) forming an ordered list, starting with the highest quantity, of said models of phonemes found in part (d)
   (e) deleting a selected number of phoneme models from the beginning of the ordered list leaving another, smaller, selected digitized list of phoneme models; and
   (f) repeating steps (c) thru (f) as long as the statistics of the rejection grammar process continue to improve over the prior determined statistics.

7. The rejection grammar process of claim 1, wherein generating the selected digitized list of phoneme models comprises the steps of:
   (a) compiling a complete list of phoneme models in the language;
   (b) compiling a list of subgroups of the phonemes in the language
   (c) forming a test set of digitized sequential representations of utterances, with known acceptable and rejectable parts thereof
   (d) running said rejection grammar process, analyzing the results found for the test set, and accumulating a false rejections list and a false acceptances list and statistics of false rejections and false acceptances; and
      (1) determining and counting the phoneme models found in the accumulated false rejection list;
      (2) forming an ordered list of phoneme models, starting with the highest quantity of said models of phonemes found in part (1)
      (3) selecting a selected number of phoneme models from the beginning of the ordered list;
      (4) for each selected phoneme, performing a process comprising:
         (a) determining whether deleting the selected phoneme will leave its subgroup void, if not,
         (b) deleting the phoneme from its subgroup and from the beginning of the ordered list, leaving another, smaller, selected digitized list of phoneme models; and
      (5) repeating step (d) as long as the statistics of the rejection grammar process continue to improve over the the prior determined statistic.

8. The rejection grammar process of claim 1, wherein generating the selected digitized list of phoneme models comprises the steps of:
   (a) compiling a complete list of phoneme models in the language;
   (b) compiling a list of subgroups of the phonemes in the language;
   (c) forming a test set of digitized sequential representations of utterances, with known acceptable and rejectable parts thereof
   (d) running said rejection grammar process, analyzing the results found for the test set, and accumulating a false rejections list and a false acceptances list and statistics of false rejections and false acceptances; and
   (e) determining and counting the phoneme models found in the accumulated false rejections list;
   (f) forming an ordered list of phoneme models, starting with the highest quantity of said phoneme models found in part (e)
   (g) deleting a selected number of phonemes from the beginning of the ordered list and adding a related merged phoneme for each first instance of a subgroup phoneme being deleted, leaving another, selected digitized list of phoneme and merged phonemes models; and
   (h) repeating step (c) thru (g) as long as the statistics of the rejection grammar process continue to improve over the prior determined statistics.

9. In a speech recognition system with a process of determining a highest first probability that an utterance is within a rejection grammar and a highest second probability that the utterance is within a main grammar, wherein the utterance is rejected if the highest first probability is higher than the highest second probability, and the utterance is accepted if the highest second probability is higher than the highest first probability, the rejection grammar process comprising the steps of:
   generating a selected digitized list of phoneme models in a language, said selected digitized list of phoneme models smaller than a digitized list of all phoneme models in the language,
   presenting a digitized sequential representation of the utterance for processing by the rejection grammar process, and
   calculating a first set of probabilities representing the match between the sequential representation of the utterance and sequential combinations, or paths, of the phoneme models from the selected digitized list of phoneme models.

10. The method of claim 9 wherein calculating the first set of probabilities comprises the steps of:
   comparing the digitized sequential representation of the utterance to all possible sequences of the phoneme models from said selected digitized list of phoneme models, and
   calculating the probabilities from said comparing step.

11. The method of claim 9 further comprising the step of:
   weighting said first set of probabilities and said second set of probabilities unequally.

12. Speech recognition apparatus having rejection grammar and a list of phonemes associated therewith, said speech recognition apparatus determining a first probabiliity that an utterance, composed of phonemes in a language, is formed of phonemes in the rejection grammar, a main grammar and a vocabulary associated therewith, said speech recognition apparatus determining a second probability that an utterance, composed of a sequence of phonemes in a language, is formed of words in the main grammar vocabulary, wherein the rejection grammar comprises:
   means for generating a selected digitized list of phoneme models in the language of the utterance, said selected digitized list being smaller than a digitized list of all phoneme models in the language,
   means for presenting a digitized sequential representation of the utterance for processing to the rejection grammar process, and means for calculating a first set of probabilities representing the match between the sequential representation of the utterance and sequential combinations, or paths, of the phoneme models from the selected digitized list of phoneme models.

13. The apparatus as defined in the claim 12, wherein the means for calculating the first set of probabilities comprises:

means for comparing the digitized sequential representation of the utterance to all possible sequences of phoneme models from said selected digitized list of phoneme models, and means for calculating match probabilities from said comparing means.

14. The apparatus as defined in the claim 12 further comprising means for weighting said first set of probabilities and said second set of probabilities unequally.

15. The apparatus as defined in the claim 12 wherein means for generating the selected digitized list of phoneme models includes means for generating a digitized list of merged phoneme models.

16. A computer system adapted for performing speech recognition and having a data structure associated therewith, said computer system including speech recognition hardware apparatus and speech recognition software, including a main grammar for recognizing an utterance and a rejection grammar for recognizing that the utterance is unknown, the data structure comprising;

a selected digitized list of phonemes for use by the rejection grammar;

a sequencer to construct lists of concatenations of the phonemes;

a digitized list of words for use by the main grammar; and a sequencer to construct lists of concatenations of the words.

17. A speech recognition program product stored in a computer useable form, comprising:

machine readable instructions for calculating a probability that an utterance is known; and machine readable instructions for calculating a probability that an utterance is unknown by comparing the digitized representations of the utterances to a stored list of selected phonemes.

18. A rejection grammar process for use in speech recognition of an utterance comprising the steps of:

generating a list of phoneme models in a language, the list selected to be a subset of all digitized of phoneme models in the language;

appending a digitized list of merged phoneme models in the language to said list of phoneme models;

presenting a digitized sequential representation of the utterance for processing by the rejection grammar process; and calculating a first set of probabilities of how well the sequential representation of the utterance matches sequential combinations of the phoneme models from the list of phoneme models and merged phonemes models.

19. The process of claim 18 wherein calculating the first set of probabilities comprises the steps of:

comparing the digitized sequential representation of the utterance to all possible sequences of the models of phonemes and merged phonemes from said selected digitized list of phoneme models and merged phonemes; and calculating the probabilities from said comparing step.

20. A speech recognition process comprising the rejection grammar process as set forth in claim 18 further comprising the steps of:

comparing the digitized sequential representation of the utterance to entries in a main grammar using an accepted main grammar process;

calculating a second set of probabilities from said comparing step;

determining a highest probability from each of the first and second sets of probabilities;

comparing the highest probabilities from each of the first and second sets of probabilities;

if the highest probability from the first and second sets of probabilities is found in the first set of probabilities, rejecting the utterance; and if the highest probability from the first and second sets of probabilities is found in the second set of probabilities, accepting the utterance.

21. The process of claim 20 further comprising the step of

Assigning an unequal weight said first set of probabilities and said second set of probabilities unequally.

22. The rejection grammar process of claim 18, wherein generating the list of phoneme models and merged phonemes models comprises the steps of:

(a) compiling a complete list of phoneme models and merged phonomes models in the language;

(b) forming a test set of digitized sequential representations of utterances, with known acceptable and rejectable parts thereof;

(c) running said rejection grammar process, analyzing the results found for the test set, and accumulating a false rejections list and a false acceptances list and statistics of false rejections and acceptances; and (d) determining if the statistics of the process are acceptable, if acceptable, using the list of phoneme models and merged phoneme models, and if not acceptable;

1. determining and counting the phoneme models found in the accumulated false rejection list;
2. forming an ordered list, starting with the highest quantity of said phoneme models found in part (1)
3. deleting a selected number of phoneme models from the beginning of the ordered list leaving another, smaller, list of phoneme models and merged phonemes models; and
4. repeating step (c) until the statistics of the process are acceptable.

23. The rejection grammar process of claim 18, wherein generating the selected digitized list of phoneme models and merged phonemes comprises the steps of:

(a) compiling a complete list of all phoneme models and merged phonemes in the language;

(b) forming a test set of digitized sequential representations of utterances, with known acceptable and rejectable parts thereof;

(c) running said rejection grammar process, analyzing the results found for the test set, and accumulating a false rejections list and a false acceptances list and statistics of false rejections and false acceptances; and (d) determining and counting the phoneme models found in the accumulated false rejections list;

(e) forming an ordered list, starting with the highest quantity of said models of phonemes found in part (d)

(f) deleting a selected number of phoneme models from the beginning of the ordered list leaving another selected digitized list of phoneme models and merged phonemes; and (g) repeating steps (c) thru (f) as long as the statistics of the rejection grammar process continue to improve over the prior determined statistics.

* * * * *